(12) United States Patent
Ronkainen

(10) Patent No.: US 9,035,940 B2
(45) Date of Patent: May 19, 2015

(54) APPARATUS AND ASSOCIATED METHODS

(75) Inventor: Sami Pekka Ronkainen, Tampere (FI)

(73) Assignee: Nokia Corporation, Espoo (FI)

( * ) Notice: Subject to any disclaimer, the term of this patent is extended or adjusted under 35 U.S.C. 154(b) by 418 days.

(21) Appl. No.: 13/042,979

(22) Filed: Mar. 8, 2011

(65) Prior Publication Data

US 2012/0229447 A1    Sep. 13, 2012

(51) Int. Cl.
| | | |
|---|---|---|
| *G06T 17/00* | (2006.01) |
| *G06F 3/0481* | (2013.01) |
| *G06F 3/048* | (2013.01) |
| *G06F 1/16* | (2006.01) |
| *G06F 3/03* | (2006.01) |

(52) U.S. Cl.
CPC .............. *G06F 3/048* (2013.01); *G06F 1/1694* (2013.01); *G06F 3/0304* (2013.01); *G06F 3/0481* (2013.01); *G06F 3/04815* (2013.01)

(58) Field of Classification Search
CPC ..................................................... G06F 3/0481
USPC ......................................................... 345/649
See application file for complete search history.

(56) References Cited

U.S. PATENT DOCUMENTS

| | | | | |
|---|---|---|---|---|
| 5,602,566 A * | 2/1997 | Motosyuku et al. | ........... | 345/684 |
| 6,016,145 A * | 1/2000 | Horvitz et al. | ................. | 715/788 |
| 6,121,960 A * | 9/2000 | Carroll et al. | .................. | 345/173 |
| 6,201,554 B1 * | 3/2001 | Lands | ............................ | 345/169 |
| 6,243,075 B1 * | 6/2001 | Fishkin et al. | ................. | 345/156 |
| 6,466,198 B1 * | 10/2002 | Feinstein | ...................... | 345/158 |
| 6,577,330 B1 * | 6/2003 | Tsuda et al. | ................... | 715/782 |
| 6,657,617 B2 * | 12/2003 | Paolini et al. | ................. | 345/173 |
| 7,103,850 B1 * | 9/2006 | Engstrom et al. | ............. | 715/778 |
| 7,138,979 B2 * | 11/2006 | Robin et al. | .................... | 345/158 |
| 7,164,432 B1 * | 1/2007 | Amemiya | ....................... | 345/649 |
| 7,173,605 B2 * | 2/2007 | Fong et al. | ..................... | 345/168 |
| 7,271,795 B2 * | 9/2007 | Bradski | .......................... | 345/158 |
| 7,289,102 B2 * | 10/2007 | Hinckley et al. | .............. | 345/156 |
| 7,365,734 B2 * | 4/2008 | Fateh et al. | .................... | 345/156 |

(Continued)

FOREIGN PATENT DOCUMENTS

| | | |
|---|---|---|
| WO | WO-2009/128593 A1 | 10/2009 |
| WO | WO-2012/120186 A1 | 9/2012 |

OTHER PUBLICATIONS

International Search Report and Written Opinion for Application No. PCT/FI2012/050075; dated Jun. 5, 2012.

(Continued)

*Primary Examiner* — M Good Johnson
(74) *Attorney, Agent, or Firm* — Alston & Bird LLP

(57) ABSTRACT

In one or more embodiments described herein, there is provided an apparatus comprising at least one processor and at least one memory having computer program code stored thereon, the computer program code and at least one memory being configured to, when run on the at least one processor, perform detection of physical tilting of a display. The display is configured to provide user visual output associated with at least one running application. The at least one running application also has a virtual keyboard associated therewith provided on the display. The computer program code and at least one memory are also configured to, when run on the at least one processor, provide, in response to detection of said physical tilting of said display, corresponding graphical tilting of an onscreen area of a display to reveal a previously off-screen area of the user visual output associated with the at least one running application.

17 Claims, 16 Drawing Sheets

(56) References Cited

U.S. PATENT DOCUMENTS

| | | | |
|---|---|---|---|
| 2,458,881 A1 | 10/2009 | Dobson | |
| 7,607,111 B2* | 10/2009 | Vaananen et al. | 715/864 |
| 7,665,033 B2* | 2/2010 | Byrne et al. | 715/782 |
| 7,859,553 B2* | 12/2010 | Bae | 345/659 |
| 7,932,882 B2* | 4/2011 | Shimotono et al. | 345/87 |
| 7,984,384 B2* | 7/2011 | Chaudhri et al. | 715/779 |
| 7,986,320 B2* | 7/2011 | Fukushima et al. | 345/419 |
| 8,019,390 B2* | 9/2011 | Sindhu | 455/566 |
| 8,159,363 B2* | 4/2012 | Song | 340/686.6 |
| 8,266,538 B2* | 9/2012 | Chaudhri et al. | 715/764 |
| 8,418,083 B1* | 4/2013 | Lundy et al. | 715/863 |
| 8,473,859 B2* | 6/2013 | Chaudhri et al. | 715/782 |
| 8,525,776 B2* | 9/2013 | Challener et al. | 345/156 |
| 8,560,960 B2* | 10/2013 | Goossens et al. | 715/782 |
| 2003/0165048 A1* | 9/2003 | Bamji et al. | 361/681 |
| 2004/0046744 A1* | 3/2004 | Rafii et al. | 345/168 |
| 2004/0100479 A1* | 5/2004 | Nakano et al. | 345/700 |
| 2006/0181510 A1* | 8/2006 | Faith | 345/158 |
| 2006/0212828 A1* | 9/2006 | Yahiro et al. | 715/810 |
| 2007/0065039 A1* | 3/2007 | Park et al. | 382/275 |
| 2008/0034321 A1* | 2/2008 | Griffin | 715/799 |
| 2009/0197635 A1* | 8/2009 | Kim et al. | 455/550.1 |
| 2009/0303204 A1* | 12/2009 | Nasiri et al. | 345/184 |
| 2009/0307633 A1 | 12/2009 | Haughay, Jr. et al. | |
| 2010/0131904 A1* | 5/2010 | Fong et al. | 715/863 |
| 2010/0138766 A1 | 6/2010 | Nakajima | |
| 2010/0171691 A1* | 7/2010 | Cook et al. | 345/156 |
| 2010/0174421 A1 | 7/2010 | Tsai et al. | |
| 2011/0167366 A1* | 7/2011 | Wagner | 715/765 |
| 2011/0252320 A1* | 10/2011 | Arrasvuori et al. | 715/704 |

OTHER PUBLICATIONS

Buzzdev.com [online] [retrieved Apr. 6, 2011]. Retrieved from the Internet: <URL: http://buzzdev.com/>. 2 pages.

Epp, C. et al., *Peek and Look: Accessing Off-Screen Targets Using Head Tracking*, UIST '08, (2008), 2 pages, date unknown.

Extended European Search Report from European Patent Application No. 12755153.9, dated Oct. 23, 2014.

* cited by examiner

APPARATUS AND ASSOCIATED METHODS

TECHNICAL FIELD

The present disclosure relates to the field of pseudo-three-dimensional displays, associated devices, methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (for example, tele-communication, video-communication, and/or text transmission (Short Message Service (SMS)/Multimedia Message Service (MMS)/emailing) functions), interactive/non-interactive viewing functions (for example, web-browsing, navigation, TV/program viewing functions), music recording/playing functions (for example, MP3 or other format and/or (FM/AM) radio broadcast recording/playing), downloading/sending of data functions, image capture function (for example, using a (for example, in-built) digital camera), and gaming functions.

BACKGROUND

Some electronic devices having a display are able to determine the angle of the display of the device relative to a user's face using, for example, face tracking using a camera of the device, or using an accelerometer to determine the angle of the device relative to the surface of the Earth, or the like. Various methods and techniques for determining viewing angle of a device by a user are known in the art.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising at least one processor and at least one memory having computer program code stored thereon, the computer program code and at least one memory being configured to, when run on the at least one processor, perform:
  detection of physical tilting of a display, the display being configured to provide user visual output associated with at least one running application, and wherein the at least one running application has a virtual keyboard associated therewith provided on the display; and
  provide, in response to detection of said physical tilting of said display, corresponding graphical tilting of an onscreen area of a display to reveal a previously off-screen area of the user visual output associated with the at least one running application.

The at least one running application may require user input to be provided by the virtual keyboard, said user input to be shown on a user input display area of the at least one running application, and wherein provision of corresponding graphical tilting comprises graphical tilting of an onscreen area of a display past the virtual keyboard to reveal the user input display area associated with the running application.

The user visual output associated with the at least one running application may be provided as a first virtual layer on the display. The virtual keyboard may be provided in a second virtual layer on the display and on top of the first virtual layer.

The corresponding graphical tilting may comprise tilting the first virtual layer only to reveal a previously off-screen area of the user visual output associated with the at least one running application.

The corresponding graphical tilting may comprise tilting the first and second virtual layers to reveal a previously off-screen area of the user visual output associated with the at least one running application.

The second virtual layer may be substantially coplanar with the plane of the first virtual layer.

The second virtual layer may be in a plane that is substantially displaced relative to the plane of the first virtual layer.

The corresponding graphical tilting of an onscreen area of a display may reveal a user input display area not previously viewable using the original viewing angle.

In another aspect, there is provided a non-transitory computer readable medium comprising computer program code stored thereon, the computer program code and computer readable medium being configured to, when run on at least one processor, perform at least the steps of:
  detecting physical tilting of a display, the display being configured to provide user visual output associated with at least one running application, and wherein the at least one running application has a virtual keyboard associated therewith provided on the display; and
  providing, in response to detection of said physical tilting of said display, corresponding graphical tilting of an onscreen area of a display to reveal a previously off-screen area of the user visual output associated with the at least one running application.

In another aspect, there is provided a method comprising:
  detecting physical tilting of a display, the display being configured to provide user visual output associated with at least one running application, and wherein the at least one running application has a virtual keyboard associated therewith provided on the display; and
  providing, in response to detection of said physical tilting of said display, corresponding graphical tilting of an onscreen area of a display to reveal a previously off-screen area of the user visual output associated with the at least one running application.

In another aspect, there is provided an apparatus comprising:
  means for detecting physical tilting of a display, the display being configured to provide user visual output associated with at least one running application, and wherein the at least one running application has a virtual keyboard associated therewith provided on the display; and
  means for graphically tilting to provide, in response to detection of said physical tilting of said display, corresponding graphical tilting of an onscreen area of a display to reveal a previously off-screen area of the user visual output associated with the at least one running application.

In another aspect, there is provided an apparatus comprising at least one processor and at least one memory having computer program code stored thereon, the computer program code and the at least one memory being configured to, when run on the at least one processor, perform:
  detection of physical tilting of a display, the display configured to provide user visual output associated with at least one running application and at least one background process; and provide, in response to detection of said physical tilting of said display, corresponding graphical tilting of an onscreen area of the display associated with the at least one running application to reveal a previously off-screen area of the display, wherein said off-screen area provides a visual indication of the progress of one of said at least one background process.

The at least one background process may be associated with at least one background application.

The at least one background process may be associated with the at least one running application.

Physical tilting of the display may detected indirectly by detecting tilting of a device comprising the display.

Physical tilting of the display may be detected directly by detecting tilting of the display itself.

The background process may be associated with one or more of the following: a download/upload manager, taskbar, application controller, or an application start bar.

The running application may be one or more of the following applications:
  address book, telephone contact number store, memo pad, diary, notebook, word processing applications, spreadsheet applications, online applications, or the like.

Applications may have one or more text entry bars, or different numbers of text entry bars to one another.

A plurality of off-screen areas may be provided in different directions from the onscreen area of the display. Graphical tilting may comprise tilting of an onscreen area of the display to reveal one of the off-screen areas of the display corresponding to the direction of graphical tilting.

In another aspect, there is provided a non-transitory computer readable medium comprising computer program code stored thereon, the computer program code and the computer readable medium being configured to, when run on at least one processor, perform at least the steps of:
  detecting physical tilting of a display, the display configured to provide user visual output associated with at least one running application and at least one background process; and
  providing, in response to detection of said physical tilting of said display, corresponding graphical tilting of an onscreen area of the display associated with the at least one running application to reveal a previously off-screen area of the display, wherein said off-screen area provides a visual indication of the progress of one of said at least one background process.

In another aspect, there is provided a method comprising:
  detecting physical tilting of a display, the display configured to provide user visual output associated with at least one running application and at least one background process; and
  providing, in response to detection of said physical tilting of said display, corresponding graphical tilting of an onscreen area of the display associated with the at least one running application to reveal a previously off-screen area of the display, wherein said off-screen area provides a visual indication of the progress of one of said at least one background process.

In another aspect, there is provided an apparatus comprising:
  means for detecting physical tilting of a display, the display configured to provide user visual output associated with at least one running application and at least one background process; and
  means for graphical tilting to provide, in response to detection of said physical tilting of said display, corresponding graphical tilting of an onscreen area of the display associated with the at least one running application to reveal a previously off-screen area of the display, wherein said off-screen area provides a visual indication of the progress of one of said at least one background process.

Any one of the apparatus described above may be one or more of the following:
  a portable electronic device, a portable radiotelephone device, a personal digital assistant (PDA) device, or a module for one of these devices.

When it is described that the apparatus is configured such that a certain act is performed, it may also encompass that the computer program code is configured to perform those acts when run on the processor.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

DESCRIPTION OF EXAMPLE ASPECTS/EMBODIMENTS

Figure 1:
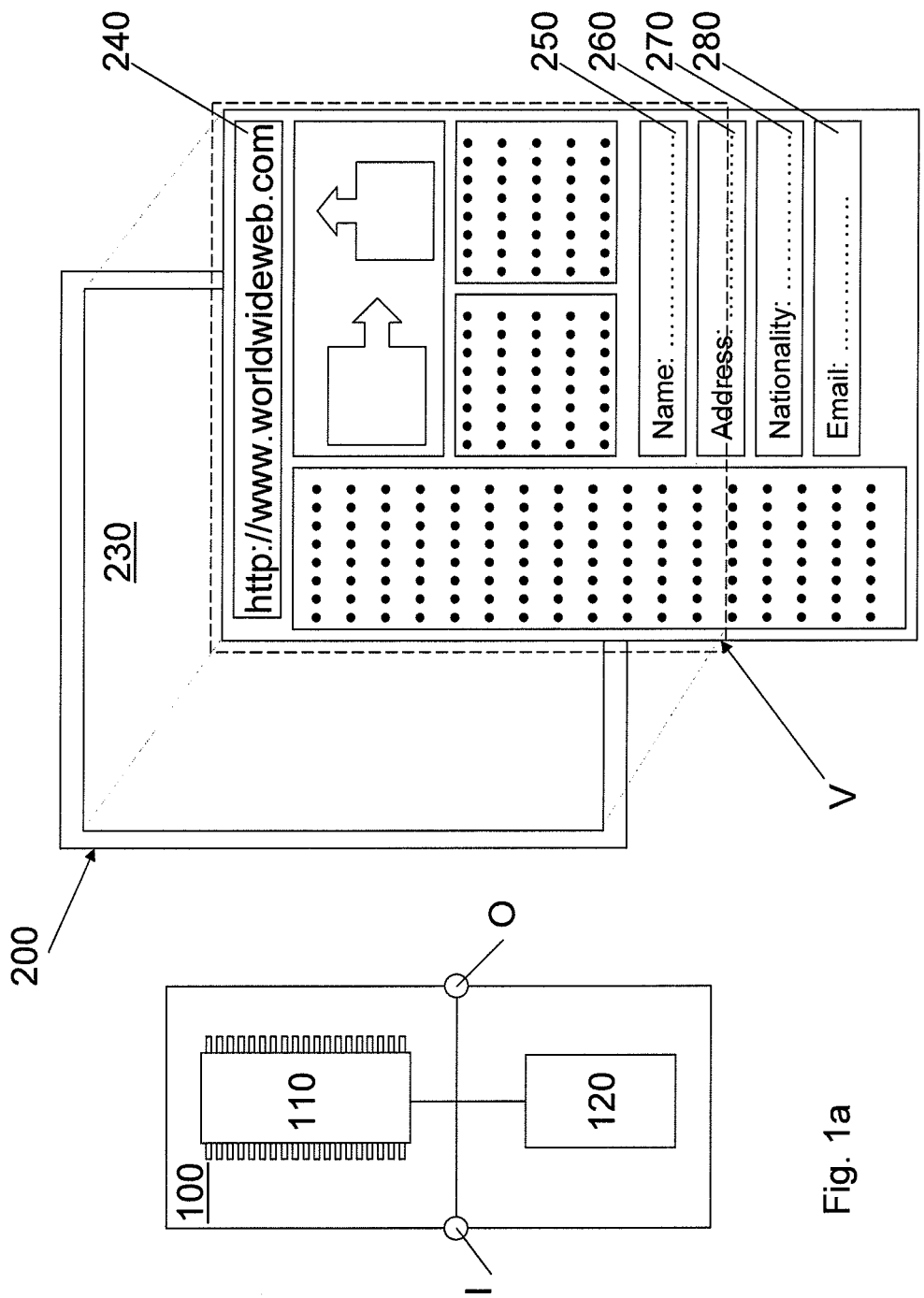
FIG. 1a shows an apparatus according to one embodiment described herein.
FIG. 1b shows a portable electronic device and user interface display.

Typically, when devices that can detect tilting or viewing angle with respect to a user are held in normal operating use, the user holds the device so that the display face of the device is substantially parallel with the plane of the user's face.

When the device is rotated or tilted around its vertical or horizontal axes, in effect tilted up/down or left/right, the view on the display can be altered to present what the user would see if the device screen were a "virtual window" to a virtual three-dimensional (3D) world. The images presented by the device user interface can be treated as a virtual layer positioned at a distance behind the 'window' of the display. When the device is rotated, because of the change in perspective of the user relative to the device, the "virtual window" of the screen allows the user to see more than that which was already displayed on the device display. The extent to which the user can see beyond that which was already displayed on the display depends on how far back from the display the virtual layer containing the original user interface view is placed behind the screen, and also depends on the degree of tilting of the device relative to the user.

In one or more embodiments described herein, there is provided an apparatus comprising at least one processor and at least one memory having computer program code stored thereon, the computer program code and at least one memory being configured to, when run on the at least one processor, perform detection of physical tilting of a display. The display is configured to provide user visual output associated with at least one running application. The at least one running application also has a virtual keyboard associated therewith provided on the display. The computer program code and at least one memory are also configured to provide, in response to detection of said physical tilting of said display, corresponding graphical tilting of an onscreen area of a display to reveal a previously off-screen area of the user visual output associated with the at least one running application.

As will be appreciated, if a device/apparatus providing an application and a keyboard on the same display, some of the display will be dedicated to the application and some will be dedicated to the keyboard. This can mean that the keyboard at least limits or can even prevent a user from viewing the full user visual output of the application. The keyboard may even occlude portion(s) of the user visual output of the application. By providing for graphical tilting of the onscreen area of the display to reveal a previously off-screen area of the user visual output associated with the at least one running application, it is possible to allow a user to tilt the device in order to see more of the user visual output of the application that would have previously been off-screen due to the keyboard preventing/limiting full viewing of that user visual output. Embodiments relating to this are discussed below. Certain embodiments allow a data entry area to be revealed which might otherwise by partially or fully obscured (such as covered or occluded) by the virtual keyboard per se.

We will now describe a first embodiment with reference to FIGS. 1a and 1b. FIG. 1a shows an apparatus 100 comprising a processor 110, memory 120, input I and output O. In this embodiment only one processor and one memory are shown but it will be appreciated that other embodiments may utilise more than one processor and/or more than one memory.

In this embodiment the apparatus 100 is an application specific integrated circuit (ASIC) for a portable electronic device 200 with a touch sensitive display 230 as per FIG. 1b. In other embodiments the apparatus 100 can be a module for such a device, or may be the device itself, wherein the processor 110 is a general purpose CPU of the device 200 and the memory 120 is general purpose memory comprised by the device 200.

The input I allows for receipt of signalling to the apparatus 100 from further components, such as components of a portable electronic device 200 or the like. The output O allows for onward provision of signalling from within the apparatus 100 to further components. In this embodiment the input I and output O are part of a connection bus that allows for connection of the apparatus 100 to further components.

The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 is a computer readable medium (solid state memory in this example, but may be other types of memory such as a hard drive) that stores computer program code. This computer program code stores instructions that are executable by the processor 110, when the program code is run on the processor 110.

In this embodiment the input I, output O, processor 110 and memory 120 are all electrically connected to one another internally to allow for electrical communication between the respective components I, O, 110, 120. In this example the components are all located proximate to one another so as to be formed together as an ASIC, in other words, so as to be integrated together as a single chip/circuit that can be installed into an electronic device (such as device 200). In other embodiments one or more or all of the components may be located separately from one another (for example, throughout a portable electronic device like device 200). In other embodiments, the functionality offered by each of the components may be shared by other functions of a given device, or the functionality required by each of the components may be provided by components of a given device.

The operation of the present embodiment will now be described, and the functionality of the computer program code will be explained.

In this embodiment, the apparatus 100 is integrated as part of a portable electronic device 200 (see FIG. 1b). The device 200 has a touch screen display 230. The device display 230 is configured to provide user visual output associated with at least one running application. In this example, the running application is a web browser application that is viewing a website "http://www.worldwideweb.com". This application displays user visual output associated with the website/webpage, and the web address bar 240 provided by the application is provided at the top of the display. The device display 230 in this example is not large enough to display the whole webpage at the given resolution, so only a portion of the webpage is displayed. This viewing window marks out what the user can actually see of the application on the display and is marked out on the figure by dashed window 'V'. A user could see the rest of the page via scrolling downwards, which would cause viewing window V to move downwards, although scrolling could be in whatever direction to user chooses to move for a given application.

The webpage, like many webpages, provides text and images for a user to browse. In addition to this, there are also text entry bars for receiving text. For example, a user may use these text entry bars to submit an online form, so as to subscribe to a newsletter, or provide their contact details, or fill in a survey, etc. In this example, there is a name entry bar 250, an address entry bar 260, a nationality entry bar 270, and an email entry bar 280 to allow a user to respond to a survey.

It will be appreciated that this example of a web browser application and website is purely illustrative and the present disclosure is not limited to just to a web browser application or webpages. Other applications may be address books, telephone contact number application (for example, telephone, email, and/or Facebook™, Twitter™, electronic and/or postal address contact details) memo pad, diary, notebook, word processing applications, spreadsheet applications, online applications, or the like. Such applications may have more or less text entry bars.

In order for text to be entered into the text entry bars, the web browser application is equipped to provide and display a virtual keyboard 290 on the touch screen display 230. The virtual keyboard 290 is associated with the web browser, and is also associated with any other application that may require a keyboard, so that a user can call up the keyboard 290 for data entry when necessary. For example, the web browser application can call up the keyboard 290 in response to the user clicking within a text entry bar, such as the name entry bar 250 or the web address bar 240.

It will be appreciated that if the keyboard 290 is brought up on the display 230, then there will be less onscreen area of the display available for showing the webpage content. This is illustrated in FIG. 2, which shows that as soon as the keyboard is brought up on the display 230 it then takes up most of the onscreen area of the display 230, as well as occluding/covering a good portion of the webpage (at least in this example).

Figure 2:
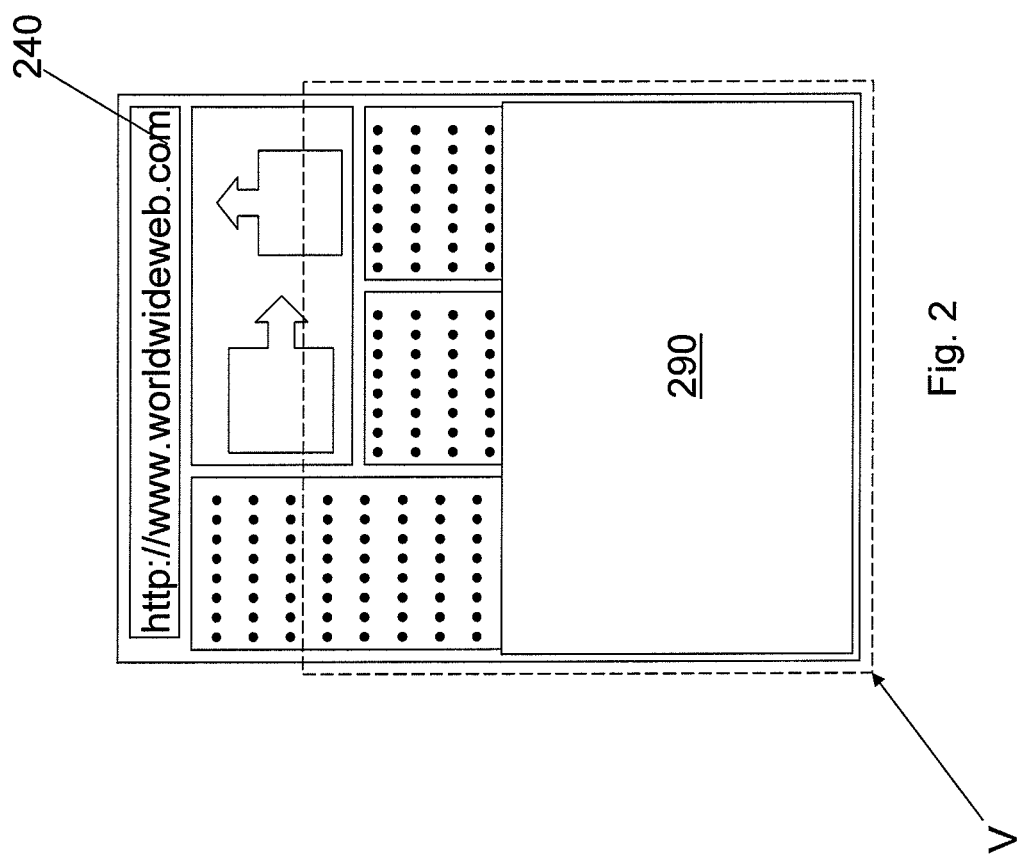
FIG. 2 shows a starting view of a display.

For example, if the user selects the name entry bar 250 and the keyboard 290 is brought up, then the name entry bar 250 will actually be covered by the keyboard 290 (as shown in FIG. 2). Similarly, if the user accidentally selected the web address bar 240 but actually wishes to enter text into a different text entry bar, then they would have to exit the keyboard 290, scroll down, and then select that other entry bar. This sort of action would be necessary because they cannot view the other text entry bars to select them, either because they are occluded by the keyboard 290 or because they have been moved off-screen.

The apparatus 100 helps to alleviate this issue. We will now describe the operation of this with reference to FIGS. 3 and 4. The instructions provided by the computer program code stored on the memory 120 of the apparatus 100 provide for specific operations to be performed, which will now be described.

Figure 3:
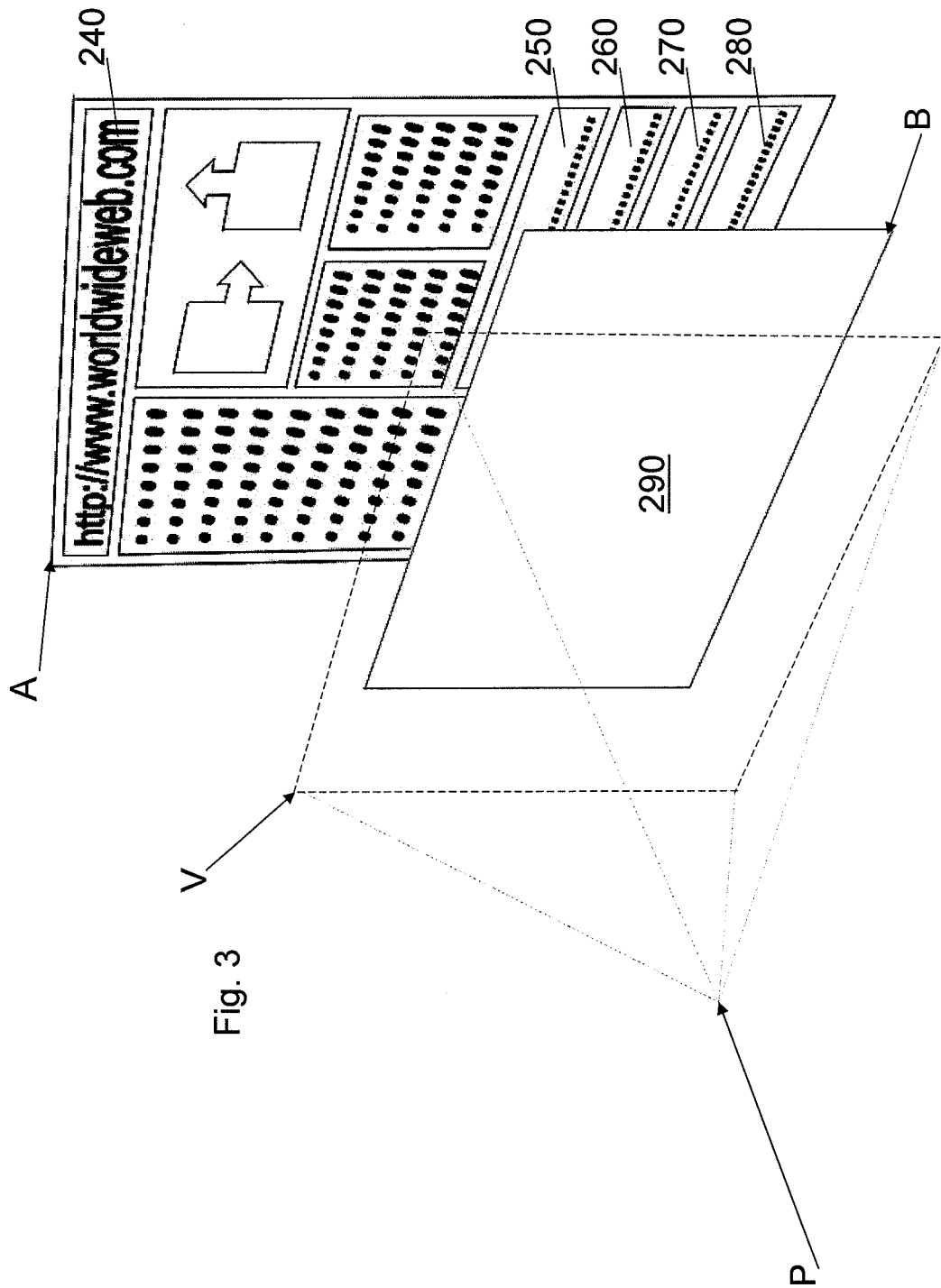
FIG. 3 shows a first view of a display.

FIG. 3 illustrates the web browser application layer 'A' and the keyboard layer 'B'. The program code of the memory 110 is configured to provide these as two separate layers A and B with a distance between them rather than superimposing one directly onto the other so that they share the same plane (at least this is the case in this embodiment). This creates a virtual 3D construct of the two layers with a distance defined therebetween. This creates the overall impression on the user that there is a three-dimensional world behind the viewing window V defined by the display 230. FIG. 3 illustrates the virtual 3D construct of the layers A and B.

FIG. 3 shows that the window V is viewed by a user from a perspective P to show a particular view of the keyboard layer B and application layer A. The keyboard layer B prevents the text entry bars at the bottom of the webpage from being viewed by a user at that perspective.

The computer program code of the apparatus 100 is configured to detect physical tilting of the display 230. This can be performed through different known tilting mechanisms, such as an accelerometer or a camera within the device that tracks the orientation of the device relative to the user. This has been discussed above and is well known in the art. The signalling from the tilting mechanism is received at the input I of the apparatus 100 and processed by the processor 110 in accordance with the instructions of the computer program code. In other embodiments, the tilting mechanism can be formed as part of the apparatus 100.

Figure 4:
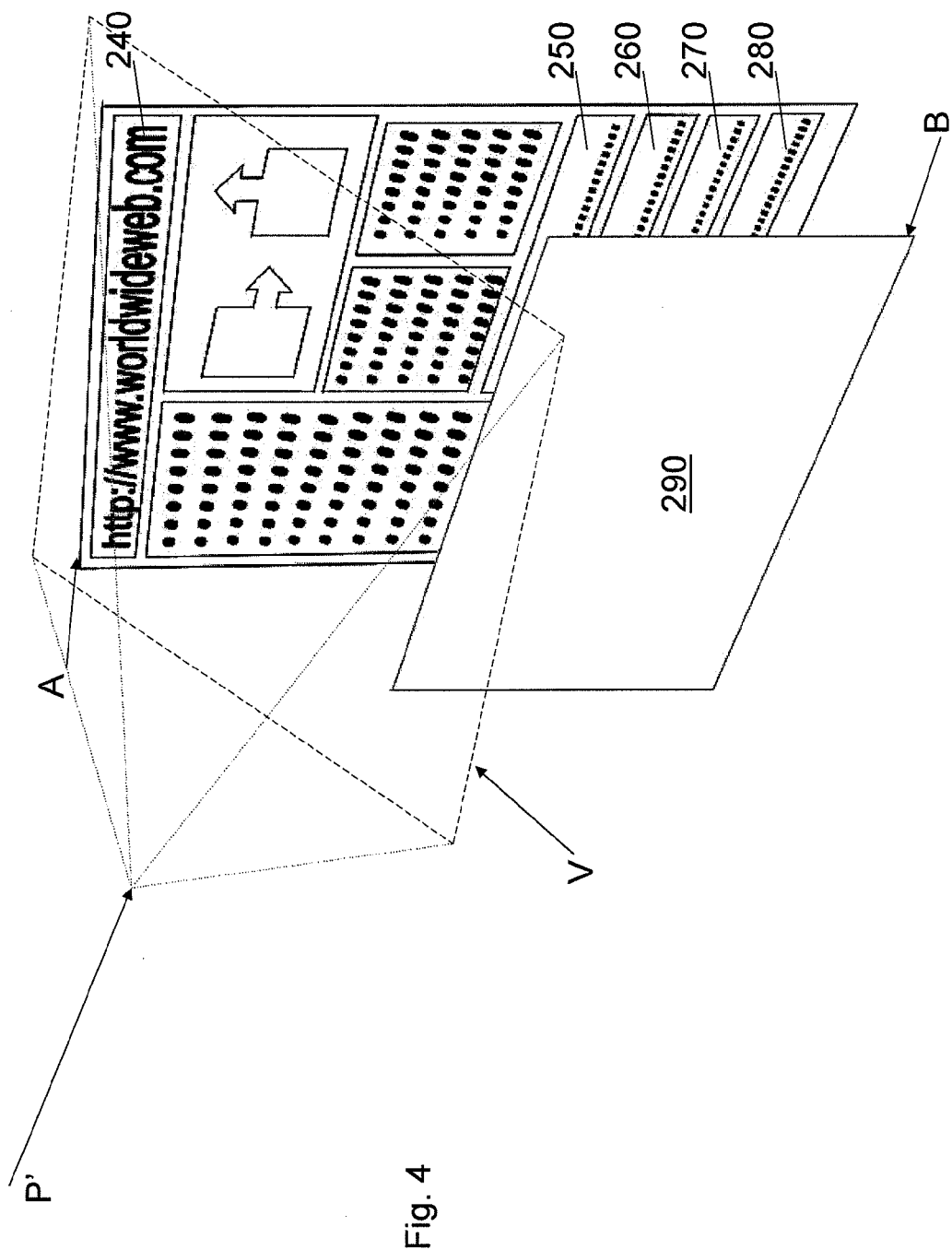
FIG. 4 shows a second view of a display.

In response to detection of said physical tilting of said display 230, the computer program code will cause the processor 110 to cause corresponding graphical tilting. Specifically, the processor 110 will cause graphical tilting of an onscreen area of the display 230 to reveal a previously off-screen area of the user visual output associated with the running application. Therefore, as a user tilts the device 200 their perspective relative to the device 200 will shift to a new perspective. This is denoted as P' in FIG. 4. This causes the apparatus 100 to cause a shift in the provided onscreen display 230 of the two layers A and B to thereby provide the illusion of a three-dimensional view of the layer arrangement. FIG. 4 shows how the user can now see (see viewing window V denoting the onscreen area of the display 230) more of the web browser application by 'peeking' behind the keyboard. This peeking can be likened to the user physically tilting the device to effectively tilt past the keyboard layer B.

This allows a user to adjust their original/relative viewing angle of the device to thereby get a view of the virtual 3D world behind the display at a different angle. So even though the text entry bars 250-280 are hidden behind the keyboard 290 in the original viewing angle/original perspective P, by physically tilting the device 200 the apparatus 100 can shift the view to correspond to the new viewing angle and user perspective to reveal text entry bars 250-280. This is illustrated in the difference between FIGS. 3 and 4. From this the user can then see previously off-screen areas that were not available for viewing in the original viewing angle.

It will be appreciated that other embodiments may be configured such that text entry bars (e.g. an active text entry bar being actively edited and/or selected) and a keyboard are both visible in a default viewing angle/perspective (for example, by automatically scrolling a web page so that the text entry bars is presented above the virtual keyboard). In this case, tilting the device would allow information around the text entry bars to be viewed. This may be advantageous where the keyboard viewed from the default perspective occupies a significant portion of the screen (for example, when a limited number of text entry bars are visible in the default perspective, or for world wide web forms with multiple single-line text entry bars). It may also allow the user to see the information (e.g. contextual information) provided around the portion of text which the user is editing. It may also allow, for example, the field label in a form (e.g. 'name', 'address', 'email address') associated with an text entry bar (visible in the default perspective) to be revealed by tilting away from the default perspective.

It will be appreciated that the default viewing angle/perspective may be defined by device settings provided by the user and/or by the device. For example, the default viewing angle/perspective may be a predetermined absolute or relative orientation of the device (e.g. a relative orientation with respect to the user), and/or a viewing angle/perspective which is maintained for a predetermined period of time and/or a viewing angle/perspective in which the user interacts with the keyboard (or other user interface).

Figure 5:
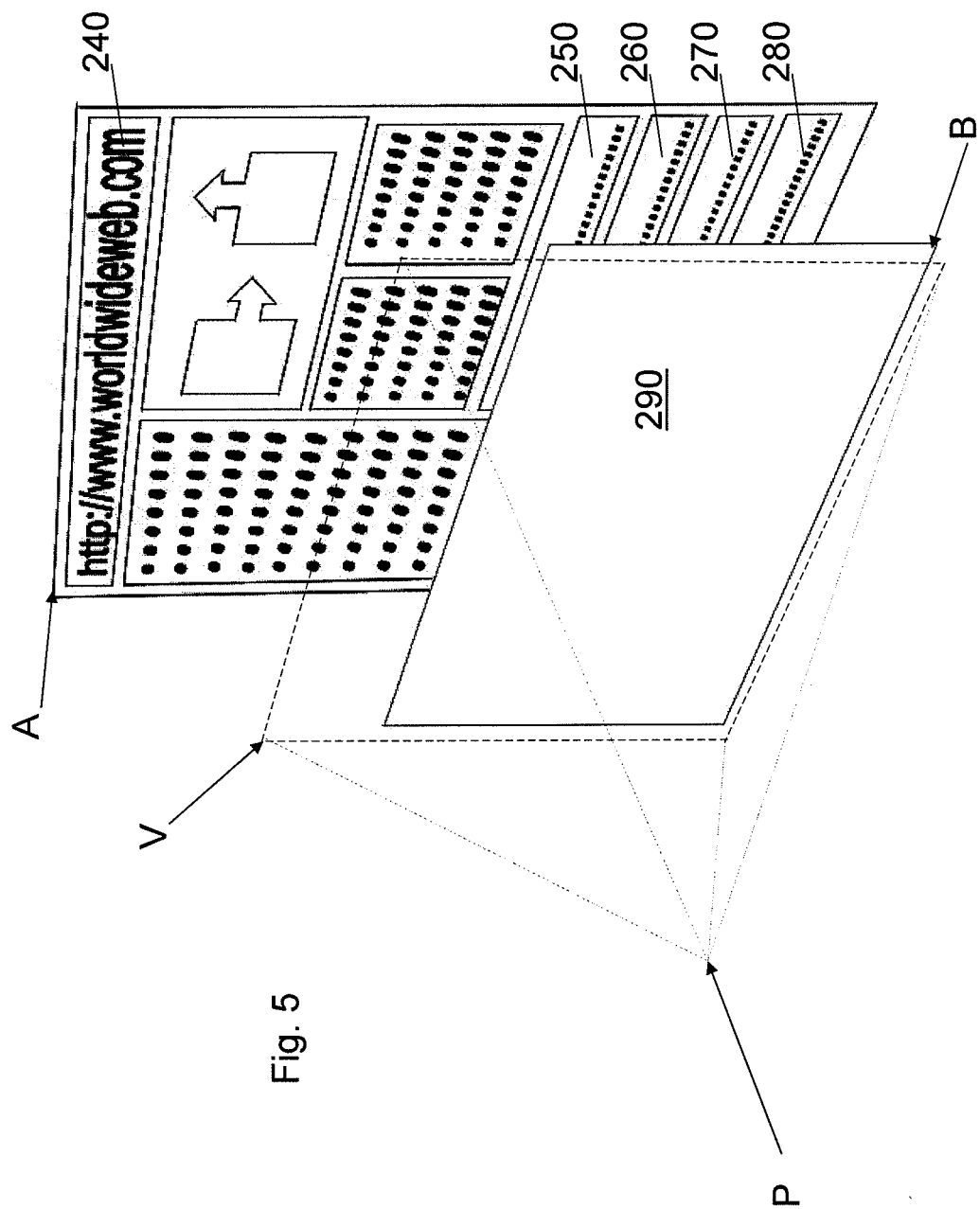
FIG. 5 shows a further view of a display.
Figure 6:
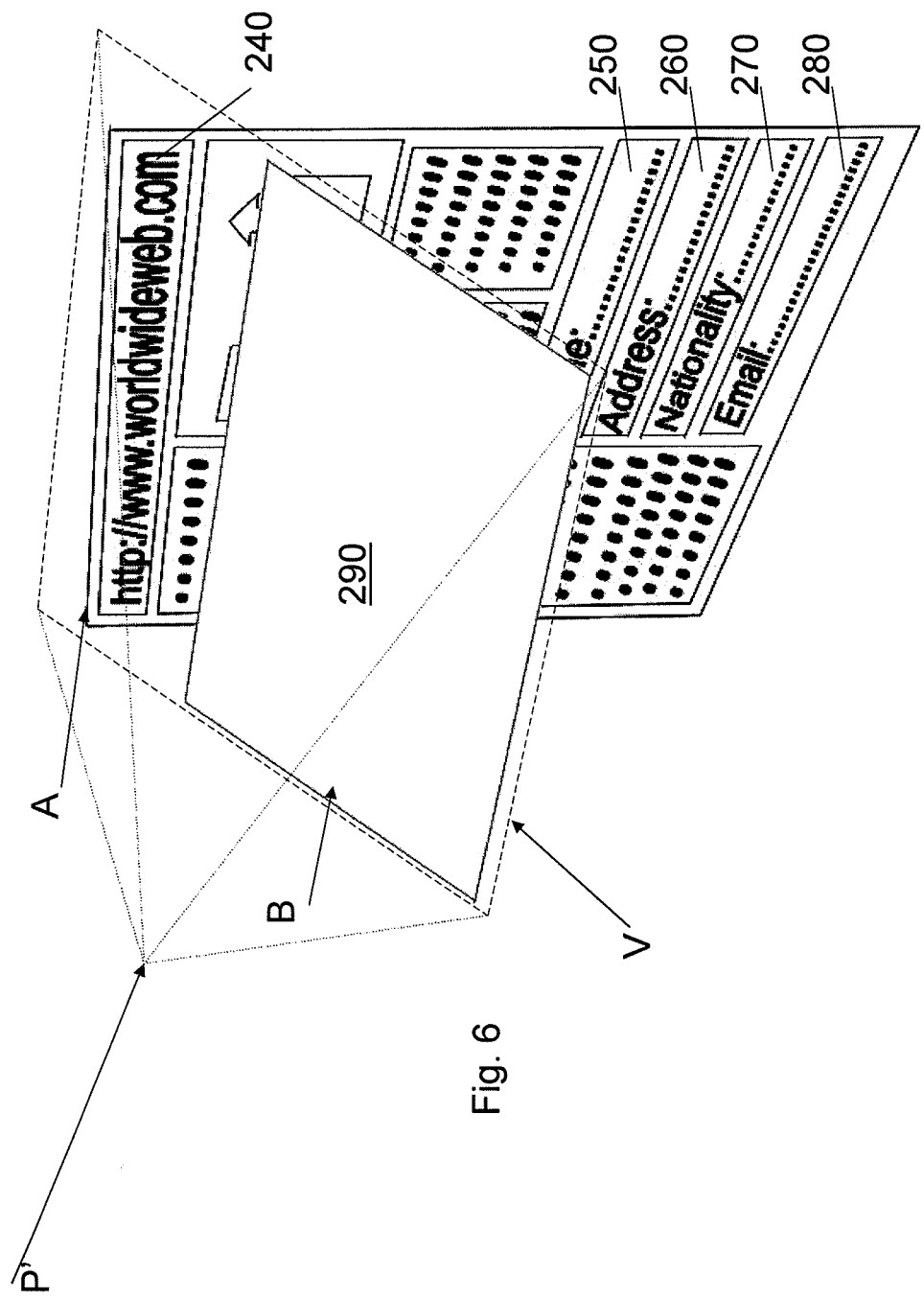
FIG. 6 shows a further display view.

FIGS. 5 and 6 show another embodiment, FIG. 5 showing a first perspective P and FIG. 6 showing a second perspective P'. While FIG. 5 is substantially the same view as shown in FIG. 3, the instructions of the computer program code do not render the keyboard 290 in three-dimensions in the same way as the embodiment of FIGS. 3 and 4. Instead, the keyboard is presented in two dimensions to the user so that, in effect, keyboard layer B is actually locked relative to the viewing window V. This, in effect, means that the keyboard 290 moves with the viewing window V as the perspective changes so that the keyboard 290 is always displayed as onscreen so that it appears to be in two dimensions.

This can clearly be seen by the difference between FIGS. 5 and 6. As a result of this, only the application layer A appears to be in three dimensions and only the first application layer is correspondingly tilted in response to physical tilting of the device. This can be helpful if a user wishes to see other portions of the application but without departing from the full keyboard functionality during tilting. The portion of the viewing window V that is not filled by the keyboard 290 can therefore be used to view different angles/regions of the application layer A through tilting.

Figure 8:
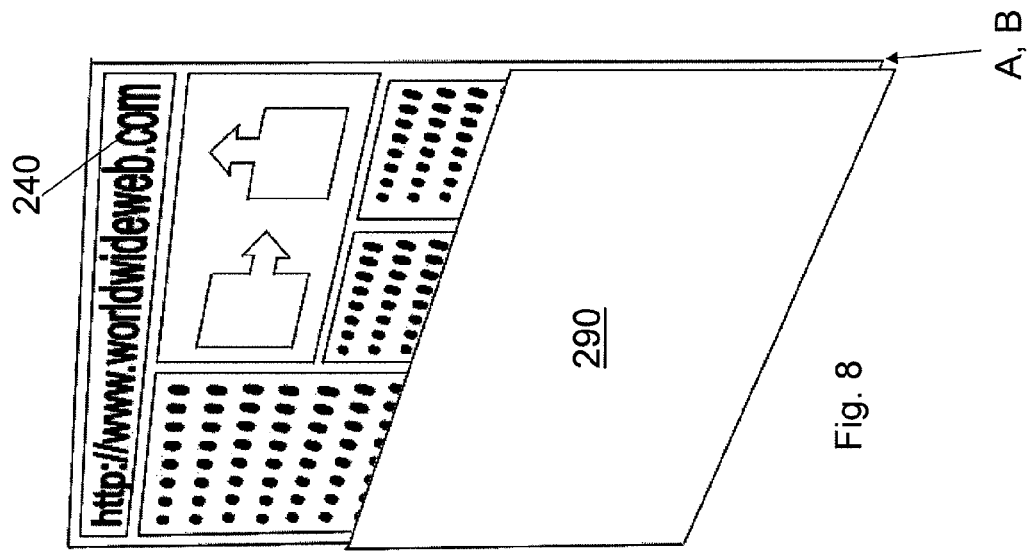
FIG. 8 shows a further display view.
Figure 7:
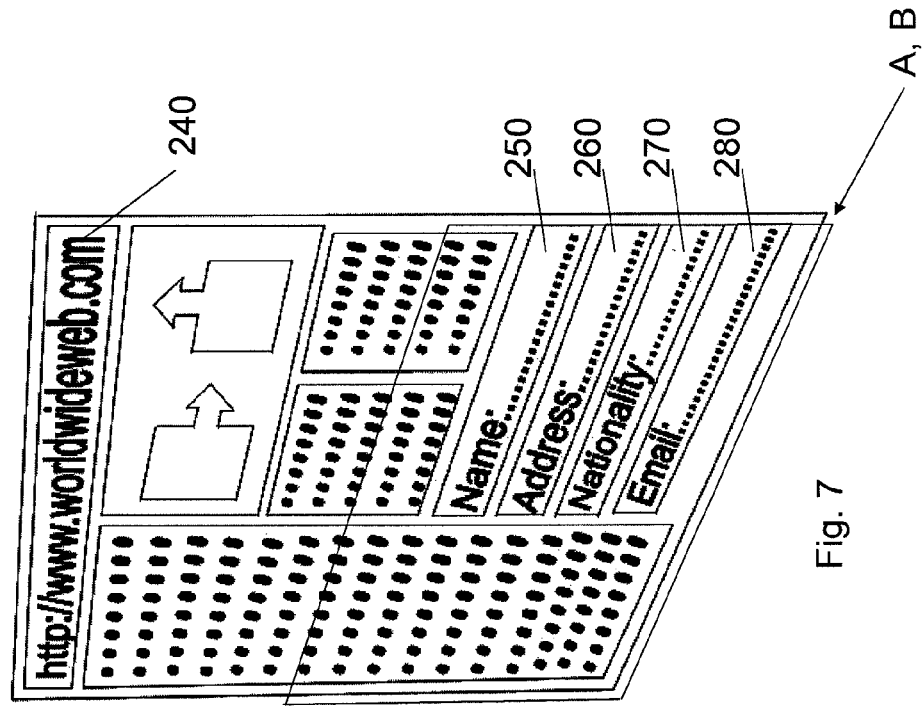
FIG. 7 shows yet another display view according to another embodiment described herein.
Figure 9:
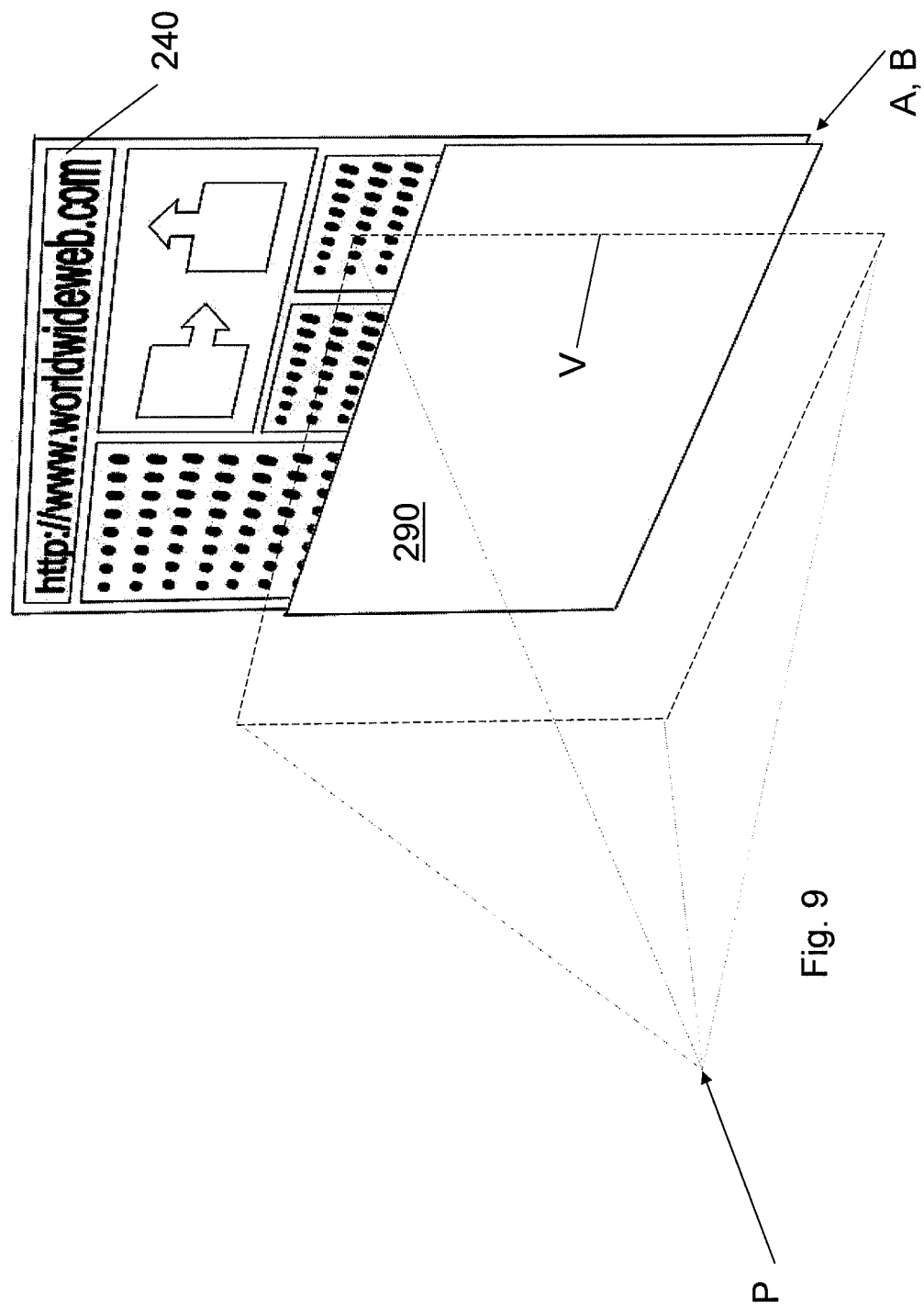
FIG. 9 shows another display view.
Figure 10:
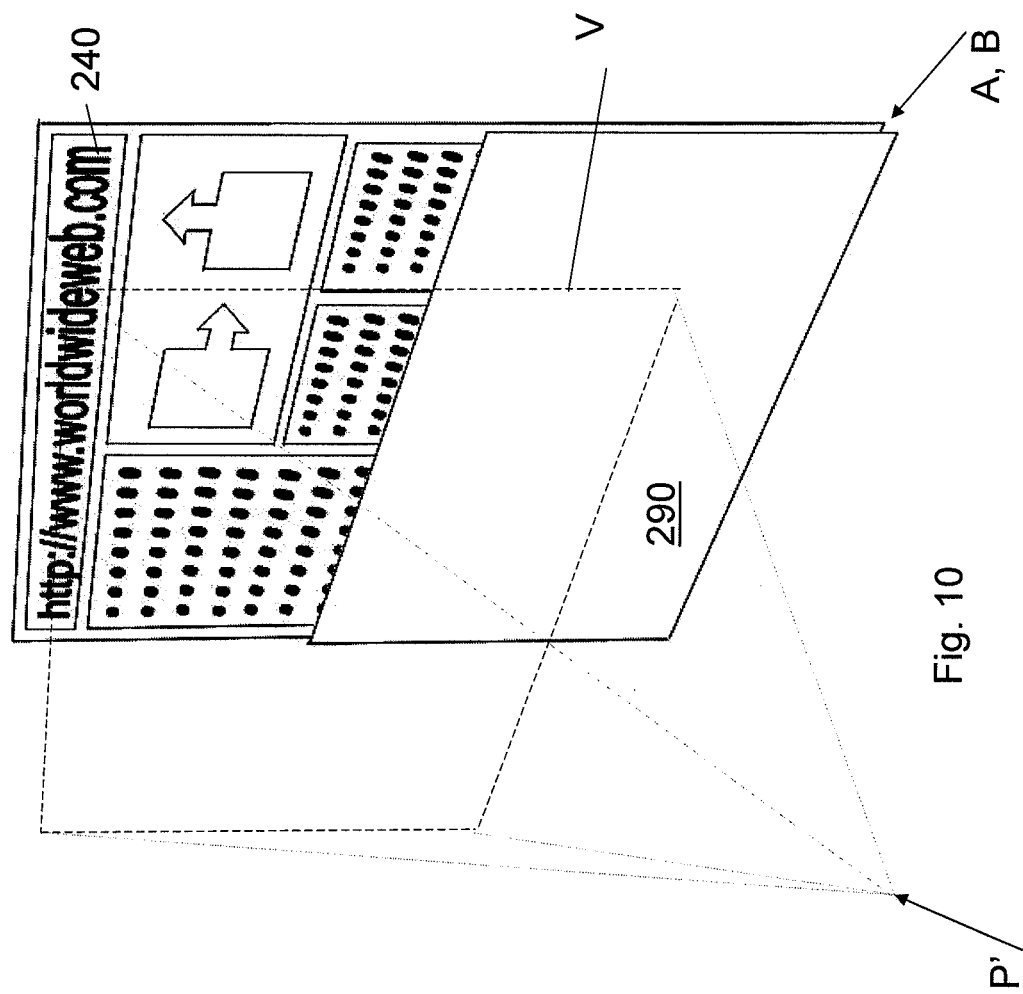
FIG. 10 shows another display view.

FIGS. 7-10 illustrate another alternative to this embodiment. In FIGS. 7 and 8, the keyboard layer B is substantially in the same plane as the application layer A so as to be more or less coplanar with one another. In FIGS. 9 and 10, if the user's perspective shifts downwards from P to P', then the corresponding graphical tilting will result in the window V shifting upwards in response to that physical tilting. This means that the user can then view an upper portion of the user visual output of the application.

It will be appreciated that the embodiments described above are not mutually exclusive to one another, and that they could be combined in the same device/apparatus as different settings (such as different user-configurable settings, or different settings for specific applications, or the like). It will be understood that in certain embodiments (such as the embodiments of FIGS. 3-4 and 7-10) the perspective of the keyboard 290 changes due to a shift in the perspective of the user changing the viewing window V. This may mean that less of the keyboard is viewed depending on the degree of tilting experienced by the device, but at the very least there is a resultant change in the perspective of the keyboard 290 to the user due to the tilting.

In other embodiments (like the embodiment shown in FIGS. 5 and 6), the perspective of the keyboard 290 does not change and so the same area of the keyboard 290 is viewable at all times in such an embodiment or setting of a device 200.

We will now describe other embodiments of the present disclosure. In one or more of these embodiments, there is provided an apparatus comprising at least one processor and at least one memory having computer program code stored thereon, the computer program code and the at least one memory being configured to, when run on the at least one processor, perform detection of physical tilting of a display. The display is configured to provide user visual output associated with at least one running application and at least one background process. The computer program code and at least one memory are also configured to provide, in response to detection of said physical tilting of said display, corresponding graphical tilting of an onscreen area of the display associated with the at least one running application to reveal a previously off-screen area of the display. This off-screen area provides a visual indication of the progress of one of said at least one background process.

Often users of devices have multiple applications or processes running at the same time. It is often difficult for a user to monitor more than one of these ongoing applications/processes easily. For example, if a user is running a first application with another process in the background, a user would typically have to minimise the current running application, and then select the other background process to check up on that process and address its progress. To return to the first application the user then has to minimise the background process in order to be able to return to the other application. This can be troublesome and tiring for a user, not to mention time consuming and, in addition, a waste of processing power and energy. These are key issues for portable battery powered devices and devices with restricted processing power. By providing for an off-screen area that provides a visual indication of at least one background process, this allows a user to physically tilt the device in order to graphically tilt the onscreen area of the display to thereby view the status of a background process in a previously off-screen area without leaving/minimising the current application. Embodiments relating to this are also discussed below.

Figure 11:
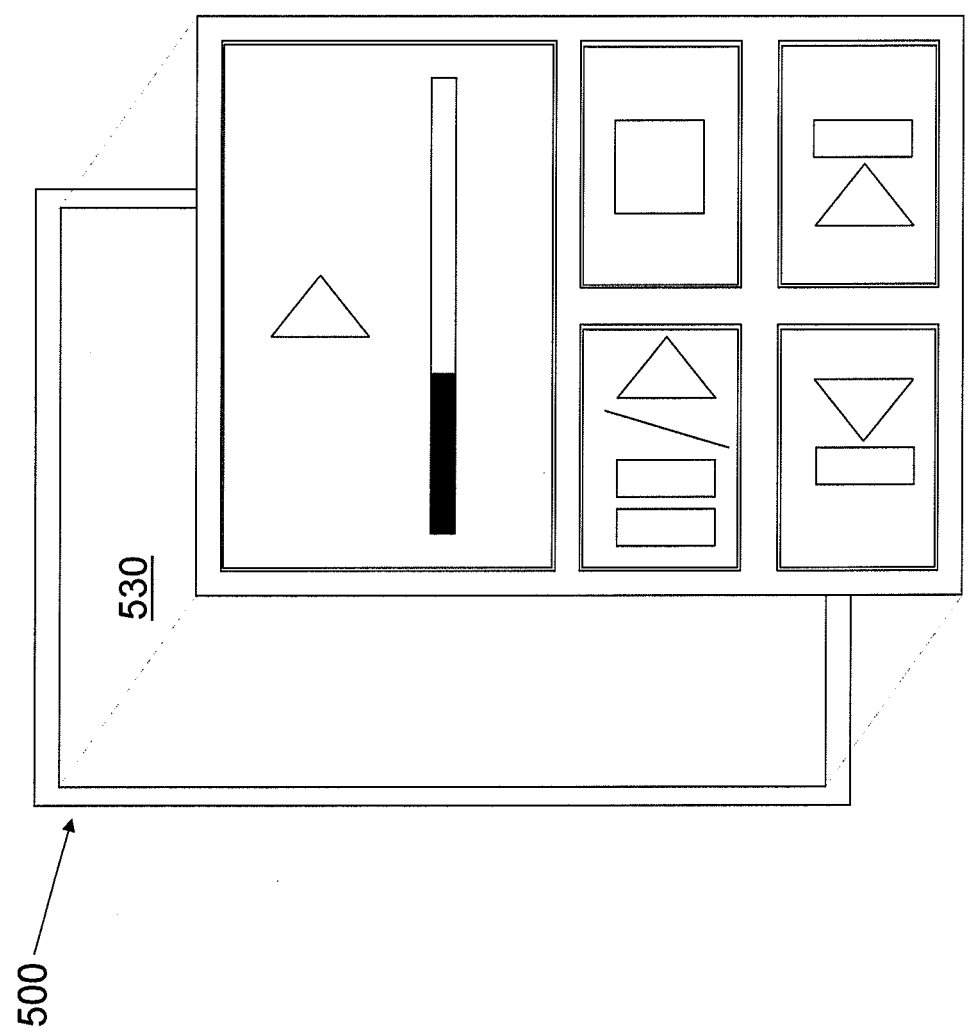
FIG. 11 shows another device and display view according to another embodiment described herein.

In one embodiment, an apparatus having a memory, processor, input and output substantially the same as the apparatus 100 of FIG. 1a is provided. In this embodiment only one processor and one memory are shown but it will be appreciated that other embodiments may utilise more than one processor and/or more than one memory. We have not shown a separate figure for this apparatus as it is sufficiently illustrated by FIG. 1a. This apparatus is implemented in a device 500 having a touch screen display 530 as shown in FIG. 11, but can of course be implemented as a module or as a device itself. The memory of the apparatus has computer program code stored thereon and is configured to perform specific steps which will be explained below.

In FIG. 11, a music player application 540 is actively running and onscreen with various functional onscreen elements for control of that application. In this example, the device 500 is a multifunctional device (such as an Apple™ iPhone™) that has various different applications and functions that allow for web browsing, downloads, online shopping, personal instant messaging, and the like.

As has been discussed above, if a user wishes to use or monitor any of the other applications/processes offered by such a multifunction device it would be necessary to minimise or exit the current running application in order to activate or attend to another application or process. For example, if a user is downloading music or a movie in the background from an online store, they may want to know how far the download has progressed. However to do so they would have to manually navigate away from the music player home screen to the download manager to check, then do the same in reverse to return to the music player home screen. This can be tedious and time consuming, as well as wasting energy and processing power.

Figure 12:
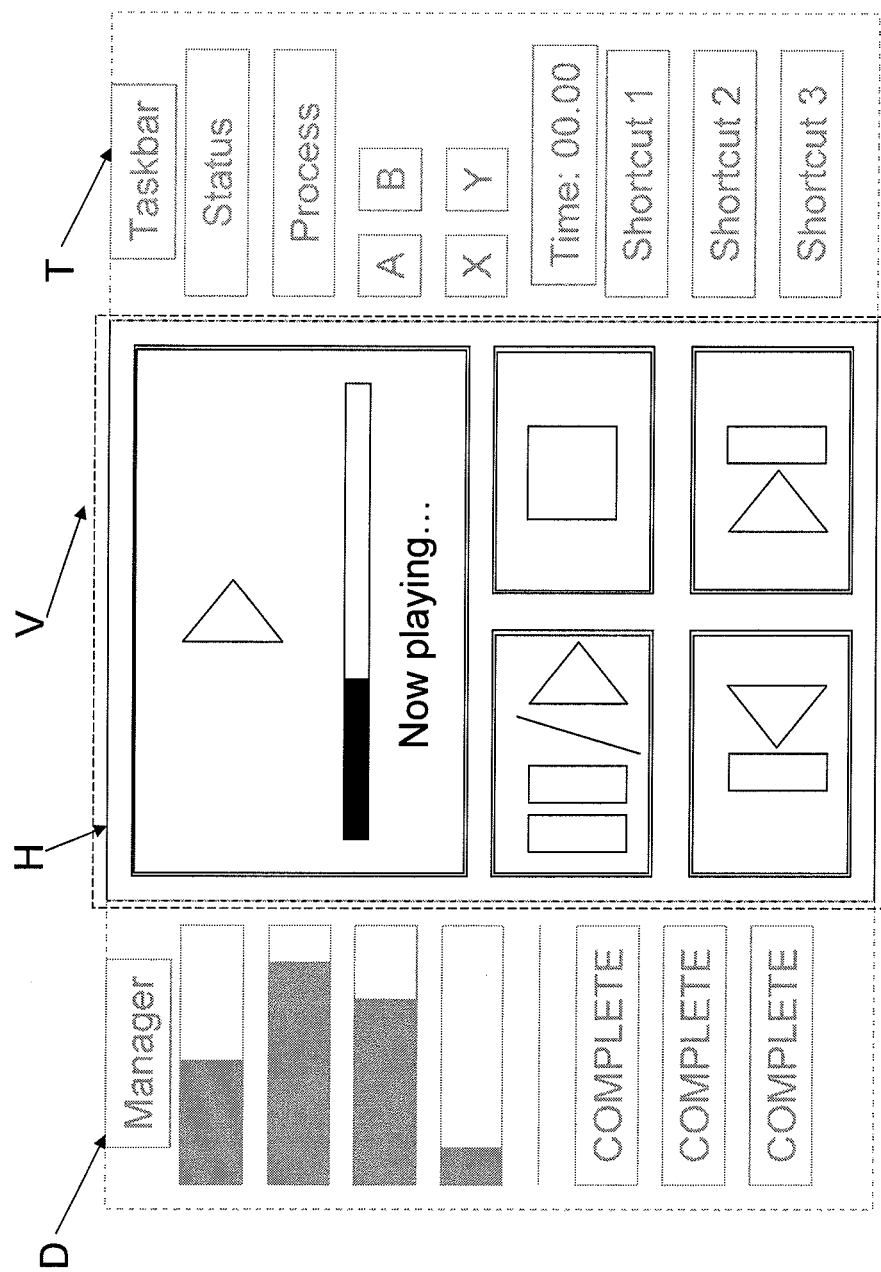
FIG. 12 shows a further display view.
Figure 13:
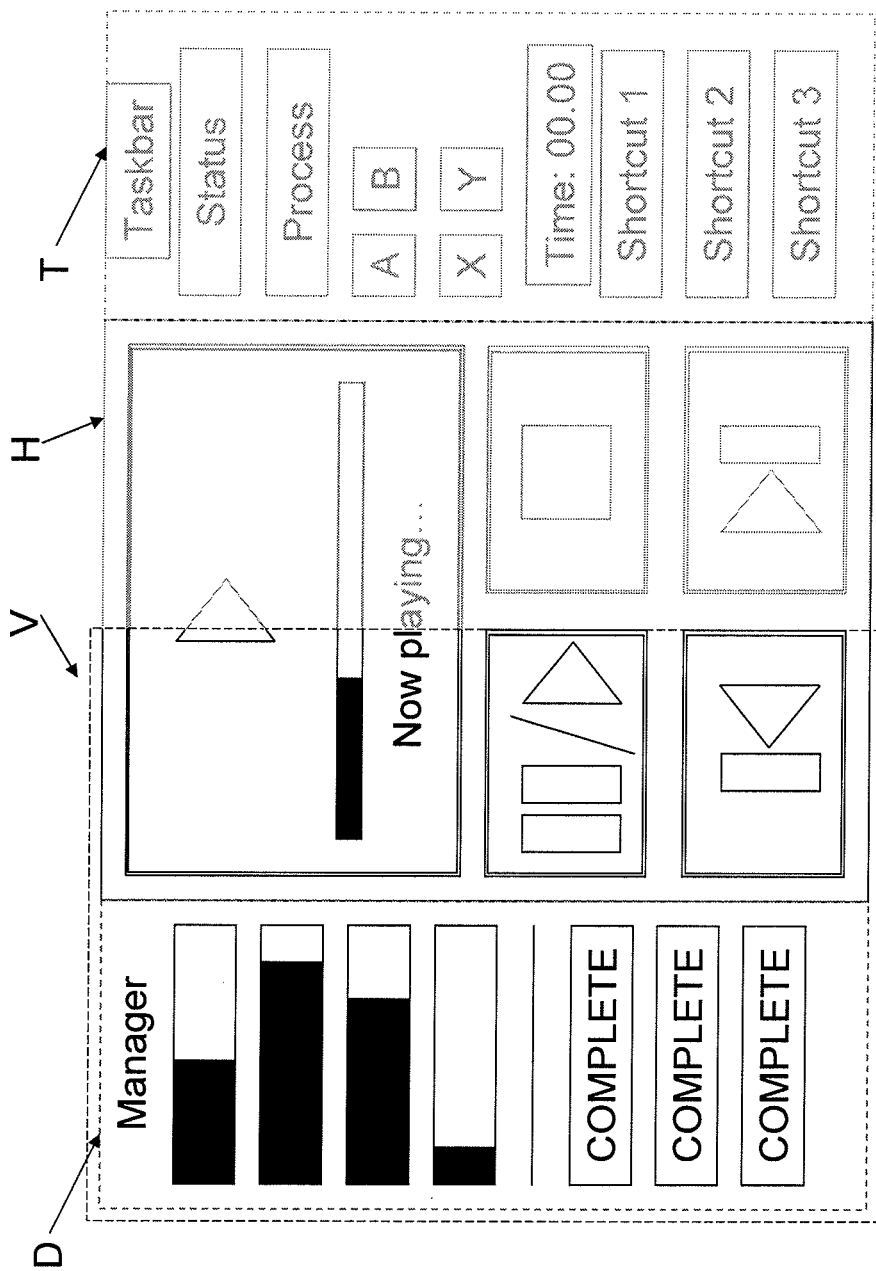
FIG. 13 shows another display view.
Figure 14:
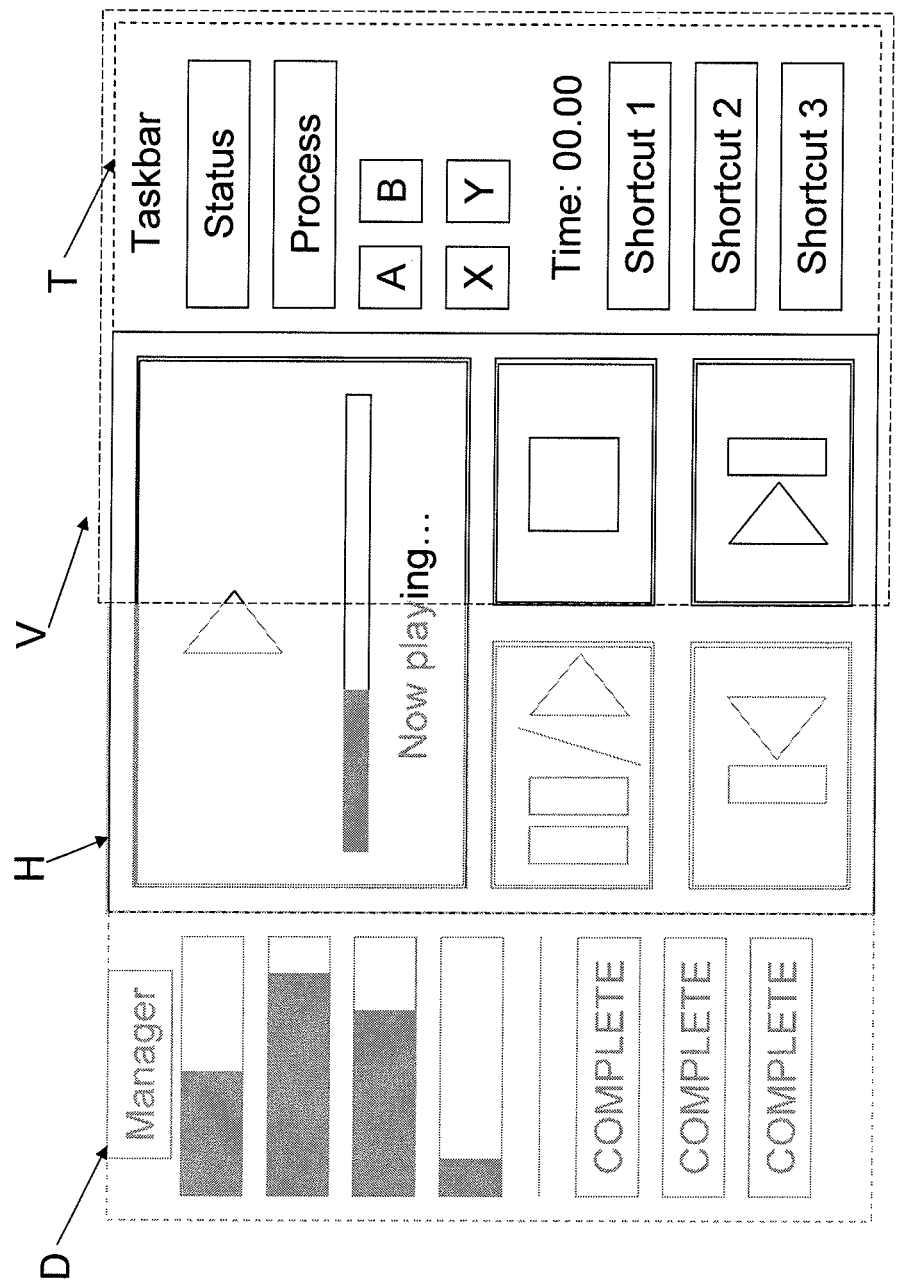
FIG. 14 shows yet another display view.

The apparatus of the present embodiment installed in device 500 is intended to alleviate this issue, and the operation is illustrated in FIGS. 12-14. FIG. 12 shows a main screen where the music application takes up the whole display 530. In this embodiment, the computer program code is configured to detect physical tilting of the device in substantially the same way as the embodiments of FIGS. 3-10. Off to the left and right of the music player home screen H is a download manager and taskbar manager respectively. Each of these areas provides an indication of background processes that may be being performed by the device.

The off-screen area to the left of the home screen H provides information regarding a download manager D. For instance, the user may have set up a download operation which takes time, and is presented as a progress bar in some download manager application. In order to know how much longer he has to wait for the download, the user needs to skip from the current application (which can be for example, a music player to kill time while the download is proceeding) to the download manager.

The off-screen area to the right of the home screen H provides for status updates and shortcuts to various other applications as a taskbar manager T. This can allow a user to quickly and easily view indications of various background processes associated with other applications, or even background processes associated with the current application.

In response to detection of said physical tilting of said display, the apparatus will cause corresponding graphical tilting of an onscreen area of the display associated with the at least one running application to reveal a previously off-screen area of the display, in other words, either the download manager D or taskbar manager T depending on the direction and degree of physical tilting experienced by the device. This is illustrated in FIGS. 12, 13 and 14. Therefore, when the user tilts the device 500 to the left (in other words, leftmost edge is now further away from the user than the rightmost edge) this causes the viewing window V to be shifted to the left (in accordance with the principles discussed above). Of course, in other embodiments, a left tilt may provide tilting of the onscreen area of the display to the right, and vice versa (like reverse orientation settings of joysticks). In other words, the graphical tilting may correspond in different ways to the physical tilting experienced by the device/device display.

When the viewing window V is shifted to the left, then the download manager D is shown. By providing an indication of the status of various downloads in progress (or uploads in progress), and the status of any finished downloads (complete, or possibly paused or aborted) in this off-screen area, a user can therefore tilt the device in order to view an off-screen area that provides a visual indication of the progress of those background processes.

Similarly, when the viewing window V is shifted to the right, then the taskbar manager T is shown. By providing an indication of such background processes and status updates and the like, this allows a user to monitor these items and activities without exiting/minimising the current application or radically departing from the main view of the current application. As can be seen from FIGS. 12-14, a tilt can reveal a great deal of information in off-screen areas and then allow a user to quickly return to the main running application.

It should be noted that, for all embodiments described herein, the graphical tilting in response to physical tilting could be continuous in the sense that the extent to which the graphical tilting is performed is proportionally correspondent with the extent of physical tilting. It should also be noted that, for all embodiments described herein, the graphical tilting in response to physical tilting could be discrete/incremental in the sense that the graphical tilting is performed in discrete steps or increments in correspondence with the tilting.

It should be noted that this idea can also be taken further than just one or two off-screen areas. For example, there may be a plurality of different off-screen areas in different directions (for example, orthogonal, radial, up/down, left/right, more than one area in one direction, adjacent areas, opposite areas, perimeter or circumferential areas, etc) from the onscreen area (in other words, home screen H). This would allow different tilting actions to reveal different off-screen areas and therefore provide different information regarding various background processes.

In essence, the user can quickly and intuitively tilt their device to obtain desired information rather than having to directly use the touch screen user interface to navigate a hierarchy of programs, files or an application/file structure.

Figure 15:
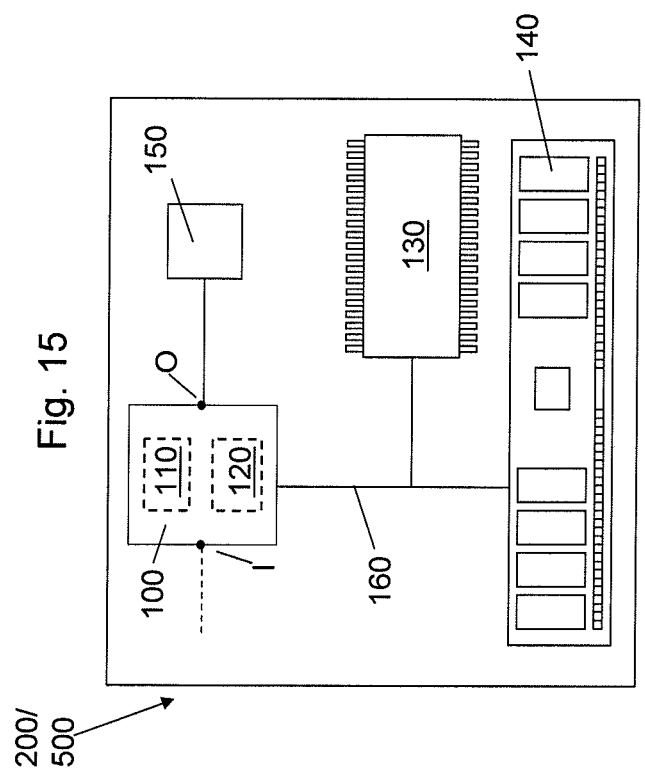
FIG. 15 shows a further embodiment of the present disclosure.

FIG. 15 illustrates how the apparatus 100 of FIG. 1*a* can be implemented in a mobile device 200 or even 500. FIG. 15 illustrates schematically a device 200/500 comprising the apparatus 100 as per any of the embodiments described above. The input I is connected to a tilting mechanism (not shown) that provides information to the apparatus 100 regarding tilting of the device 200/500. The output O is connected to a display controller 150 to allow the apparatus 100 to control the visual output of the display 230/530.

The device 200/500 may be an electronic device, a portable electronic device, a portable telecommunications device, or a module for any of the aforementioned devices. The apparatus 100 can be provided as a module for such a device 200/500, or even as a processor for the device 200/500 or a processor for a module for such a device 200/500. The device 200/500 also comprises a processor 130 and a storage medium 140, which may be electrically connected to one another by a data bus 160.

The processor 130 is configured for general operation of the apparatus 100 by providing signalling to, and receiving signalling from, the other device components to manage their operation.

The storage medium 140 is configured to store computer code configured to perform, control or enable the making and/or operation of the apparatus 100. The storage medium 140 may also be configured to store settings for the other device components. The processor 130 may access the storage medium 140 to retrieve the component settings in order to manage the operation of the other device components. The storage medium 140 may be a temporary storage medium such as a volatile random access memory. On the other hand, the storage medium 140 may be a permanent storage medium such as a hard disk drive, a flash memory, or a non-volatile random access memory.

Figure 16:
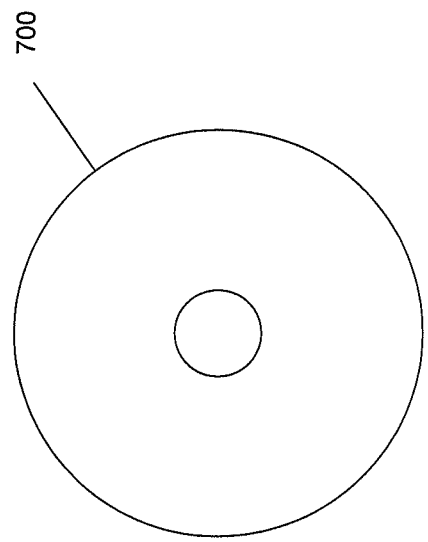
FIG. 16 illustrates schematically a computer readable media providing a program according to an embodiment described herein.

FIG. 16 illustrates schematically a computer/processor readable media 700 providing a program according to an embodiment described herein. In this example, the computer/processor readable media is a disc such as a digital versatile disc (DVD) or a compact disc (CD). In other embodiments, the computer readable media may be any media that has been programmed in such a way as to carry out an inventive function.

Figure 17:
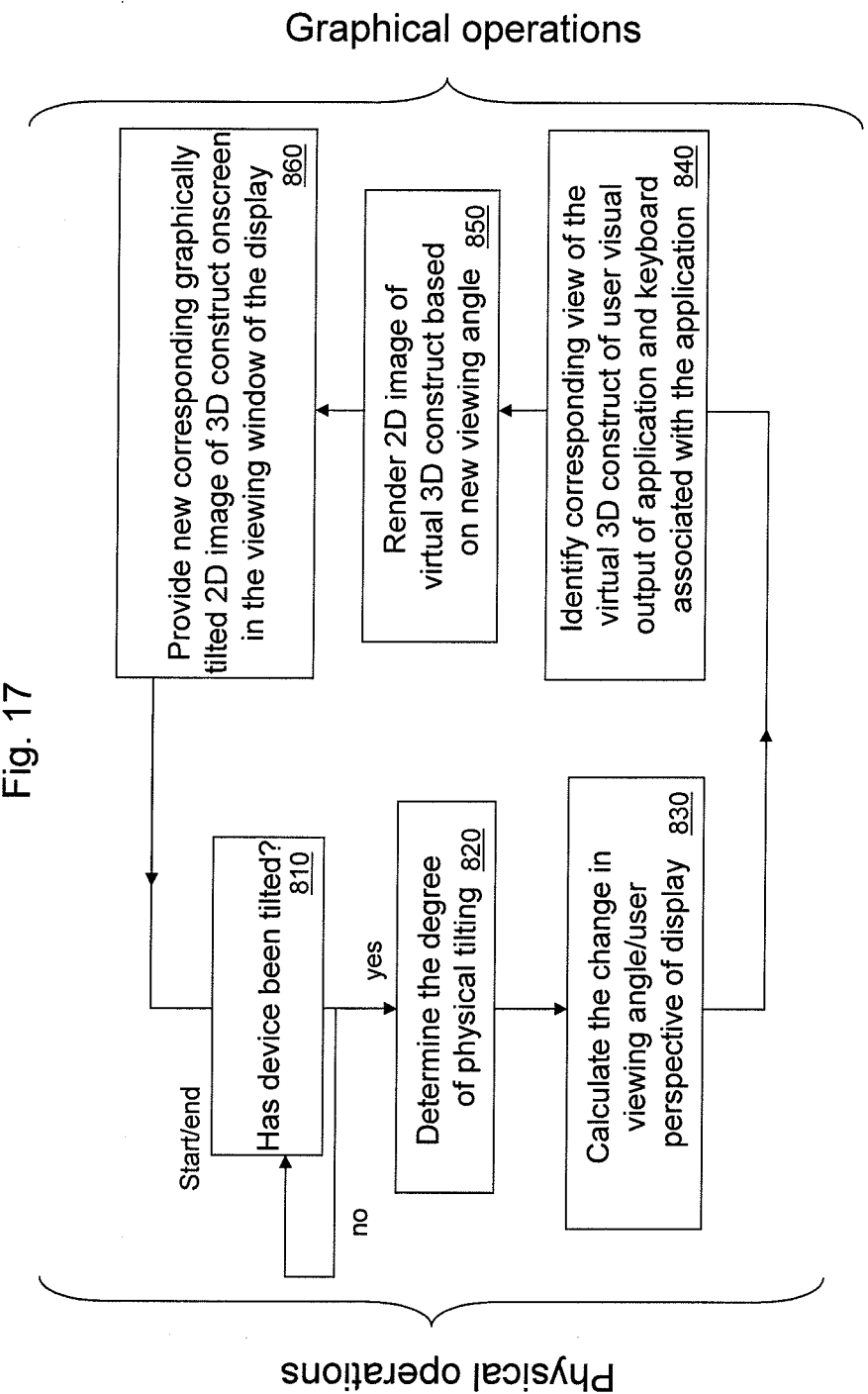
FIG. 17 shows a method flowchart according to one or more embodiments described herein.

FIG. 17 illustrates a flowchart of operation for one or more embodiments described above. In particular this flowchart denotes respective steps that show how the physical tilting is interpreted by the apparatus 100, and how graphical tilting is then determined by the apparatus 100. In effect, the start point and end point is step 810, and the method is cyclical. The apparatus 100 is constantly or intentionally monitoring to see whether the device (for example, device 200) has been tilted. In actuality, it is the angle of the display 230 relative to the user that is of interest, therefore the angle of the display 230 may instead be monitored directly, rather than indirectly by virtue of monitoring the device 200 itself.

If no tilting is detected, then it does not proceed to the next stage, but continues to monitor tilting.

Upon tilting being detected, step 820 is performed to determine the degree of physical tilting being experienced. Once the extent to which the device display 230 has been tilted is known, the corresponding change in viewing angle can be determined. This will ultimately determine how much the graphics being provided on the display 230 need to be altered. As has been discussed above, the extent/degree of physical tilting may be manifested as graphical tilting in a continuous/directly proportional way to the physical tilting, but may also or alternatively be performed in discrete steps or increments in correspondence with the extent of the physical tilting.

Upon moving to step 840, the process is now focused on applying the data relating to the physical tilting to the virtual graphical tilting. This step involves identifying the corresponding view of the 3D construct that has the keyboard layer B and application A as discussed above based on the change in viewing angle.

Once this new view is established, a 2D image for viewing on the display 230 is rendered from that 3D construct based on that new viewing angle. This new 2D image is then rendered on the display 230 in step 860, thereby providing a pseudo-3D display image. The user is provided with the illusion that the arrangement of the keyboard layer B and application layer A are actually 3D constructs behind the viewing window V of the display 230.

Figure 18:
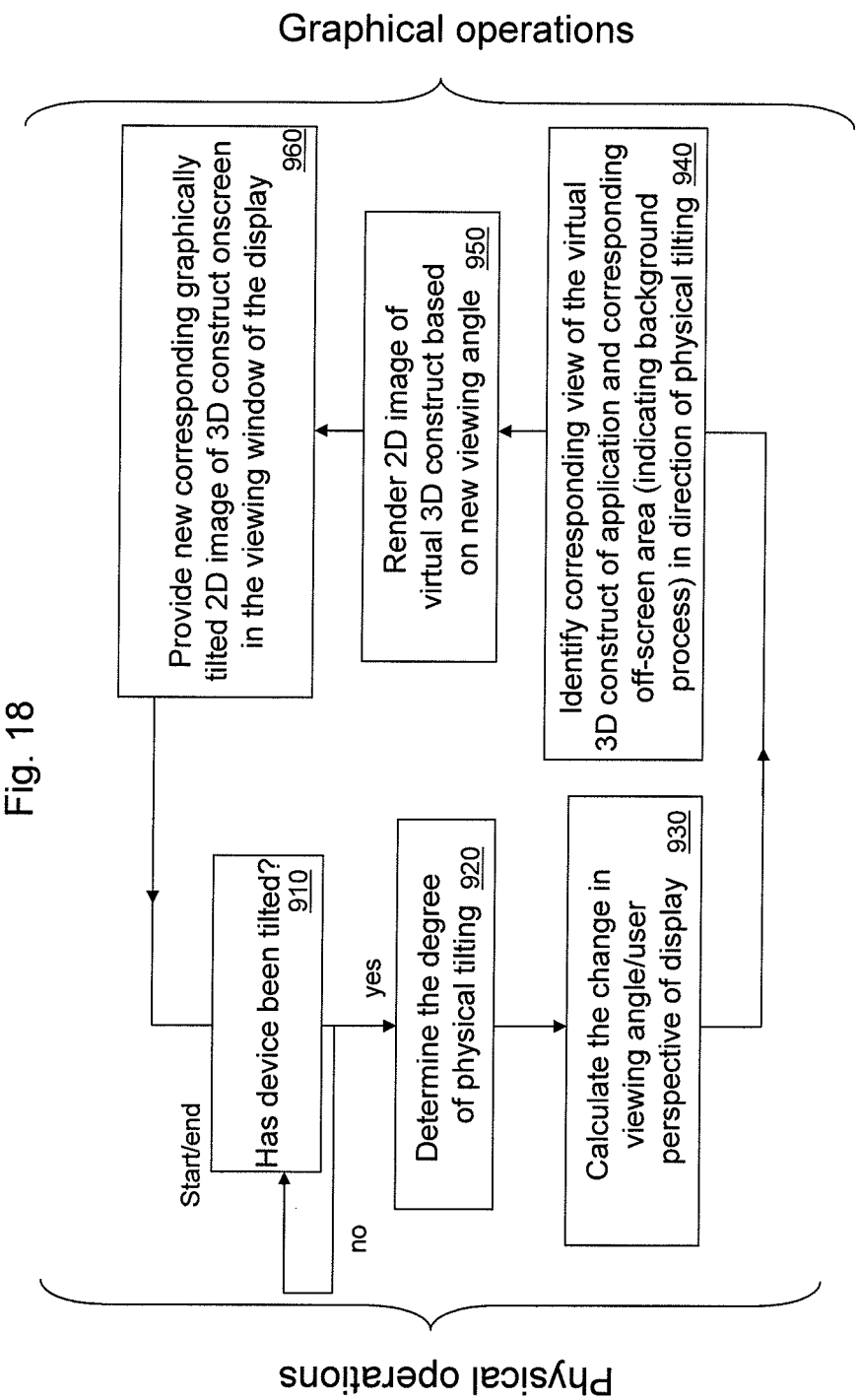
FIG. 18 shows a method flowchart according to one or more embodiments described herein.

FIG. 18 illustrates a flowchart of operation for one or more embodiments described above. This is substantially similar to the operation of FIG. 17, including the generation of a 2D image from a 3D construct, except that the 3D construct is different in this example.

In effect, once the change in viewing angle is established, the new corresponding view of the 3D construct is identified. This 3D construct comprises a home screen H (as discussed above) and off-screen areas that provide indication(s) of background process(es). This way, when the display 530 is tilted and an off-screen area is brought onscreen as a result, it is possible to review/attend to the background process(es).

The detection of tilting and the changing of views/viewing angle can be provided by virtue of an operational mode which may be switched on/off or configured by a user, for example. It will be appreciated to the skilled reader that any mentioned apparatus/device and/or other features of particular mentioned apparatus/device may be provided by apparatus arranged such that they become configured to carry out the desired operations only when enabled, for example, switched on, or the like. In such cases, they may not necessarily have the appropriate software loaded into the active memory in the non-enabled (for example, switched off state) and only load the appropriate software in the enabled (for example, on state). The apparatus may comprise hardware circuitry and/or firmware. The apparatus may comprise software loaded onto memory. Such software/computer programs may be recorded on the same memory/processor/functional units and/or on one or more memories/processors/functional units.

The previously described embodiments may be configured to be used in a landscape mode and/or a portrait mode. It will be appreciated that a running program may be configured to provide user visual output configured to be displayed in a particular mode (e.g. with a specific aspect ratio) or on a particular device (e.g. a desktop computer screen). For example, a user visual output online form (or other webpage) may have a different aspect ratio that that of the screen (e.g. the user visual output may be designed to be displayed in landscape mode but the user is using portrait mode). In such a case, the device may be configured to enable the user to view portions of the user visual output, not visible from one viewing perspective, by tilting the device.

It will be appreciated that, as information may be revealed in response to tilting, the virtual keyboard may occupy a more significant portion of the screen whilst not restricting the information available to the user. This may allow more keys to be displayed on the keyboard and/or provide a more user-friendly interface. For example, in landscape mode the keyboard may cover a significant portion of the screen, whereas the space for the user visual output may be limited (e.g. the user may only be able to view the bottommost row of a multi-line text field from a first perspective). Nevertheless, although from the first perspective, the user may see one portion of the user visual output, the user can reveal other portions of the user visual output (e.g. portions of text which had been entered previously) by tilting the device.

It will be appreciated that previously described embodiments may allow the user to be aware of the textual region which the user is interacting with and/or has been selected. For example, the user visual output may comprise a webpage form having multiple textual input regions. If, for example, two textual input regions are close to each other, it may be difficult for the user, viewing the screen from one perspective, to accurately select one of the textual input regions and know which textual input region has been selected. However, by providing additional information, corresponding to a previously off-screen area, in response to tilting, the user may see what is above and below the current row, thereby enabling the user to determine which row has been selected.

In addition, for example, webpage forms may have one or more text input regions and associated explaining titles displayed adjacent to the text input regions. Providing, in response to detection of said physical tilting of said display, corresponding graphical tilting of an onscreen area of a display to reveal a previously off-screen area allows the text input region to occupy a significant portion of the screen when viewed from a certain viewing perspective (e.g. show only the last part of the explanation and reserve more space for the text field itself). In this case, to check what the text input region is about, the user can tilt the device to see more of the associated explaining title.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/processor may have other functions in addition to the mentioned functions, and that these functions may be performed by the same apparatus/processor. One or more disclosed aspects may encompass the electronic distribution of associated computer programs and computer programs (which may be source/transport encoded) recorded on an appropriate carrier (for example, memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (for example, including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising at least one processor and at least one memory having computer program code stored thereon, the computer program code and at least one memory being configured to, when run on the at least one processor, perform:
    receive indication of a selection of a first virtual layer, and a physical tilting of a display, the display being configured to provide user visual output associated with at least one running application; and
    provide, in response to receiving the indication of said physical tilting of said display, corresponding graphical tilting of the first virtual layer to reveal at least a portion of a second virtual layer previously hidden by the first virtual layer, wherein the second virtual layer remains in a same position, wherein prior to the graphical tilting, a plane of the second virtual layer is parallel to a plane of the selected first virtual layer, and after the tilting, the plane of the second virtual layer is not parallel to the first virtual layer.

2. The apparatus of claim 1, wherein the first layer comprises a virtual keyboard.

3. The apparatus of claim 1, wherein the apparatus is configured such that the graphical tilting results in a change of a viewing angle of the first virtual layer.

4. The apparatus of claim 1, wherein receiving the indication of the physical tilting of the display comprises receiving indication of tilting of a device comprising the display.

5. The apparatus of claim 1, wherein the running application is one or more of the following applications:
    address book application, contacts application, memo pad application, diary application, notebook application, word processing application, spreadsheet application, or online application.

6. The apparatus of claim 1, wherein the apparatus is one or more of the following:
    a portable electronic device, a portable radiotelephone device, a personal digital assistant (PDA) device, or a module for one of these devices.

7. The apparatus of claim 1, wherein said second virtual layer provides a visual indication of the progress of one of said at least one background process.

8. The apparatus of claim 7, wherein the running application is one or more of the following applications:
    a download manager, an upload manager, taskbar, application controller, or an application start bar.

9. The apparatus of claim 7, wherein the at least one background process is associated with at least one background application running in addition to the running application.

10. The apparatus of claim 7, wherein the apparatus is configured such that the at least one background process is associated with the at least one running application.

11. The apparatus of claim 1, wherein the graphical tilting comprises revealing at least one portion of the first virtual layer corresponding to the direction of graphical tilting, wherein the at least one portion was positioned off the display prior to the graphical tilting.

12. The apparatus of claim 1, wherein the graphical tilting of the first virtual layer comprises changing a perceived viewing angle of the first virtual layer using three-dimensional effects.

13. The apparatus of claim 1, wherein the computer program code and at least one memory are further configured to:
    change a position of the first virtual layer in response to receiving the indication of the physical tilting.

14. The apparatus of claim 1, wherein the first virtual layer utilizes less area of the display after the graphical tilting than before the graphical tilting, and the second virtual layer utilizes more area of the display after the graphical tilting than before the graphical tilting.

15. The apparatus of claim 1, wherein the computer program code and at least one memory are further configured to:
    cause the first virtual layer to appear to move away from the display.

16. A computer program product comprising at least one non-transitory computer readable storage medium comprising computer-executable program code instructions stored therein, the computer-executable program code instructions comprising program code instructions to:
    receive indication of a selection of a first virtual layer, and a physical tilting of a display, the display being configured to provide user visual output associated with at least one running application; and
    provide, in response to receiving the indication of said physical tilting of said display, corresponding graphical tilting of the first virtual layer to reveal at least a portion of a second virtual layer previously hidden by the first virtual layer, wherein the second virtual layer remains in a same position, wherein prior to the graphical tilting, a plane of the second virtual layer is parallel to a plane of the selected first virtual layer, and after the tilting, the plane of the second virtual layer is not parallel to the first virtual layer.

17. A method comprising:
    receiving indication of a physical tilting of a display, the display being configured to provide user visual output associated with at least one running application; and
    providing, in response to receiving the indication of said physical tilting of said display, corresponding graphical tilting of a first virtual layer to reveal at least a portion of a second virtual layer previously hidden by the first virtual layer, wherein the second virtual layer remains in a same position.

\* \* \* \* \*